United States Patent [19]

Miles, Jr. et al.

[11] 3,732,025

[45] May 8, 1973

[54] METHOD FOR MACHINING VALVE BODY CASTINGS

[75] Inventors: Harry E. Miles, Jr.; Dale W. Wright, both of Saginaw, Mich.

[73] Assignee: Miles Machinery Company, Saginaw, Mich.

[22] Filed: June 15, 1971

[21] Appl. No.: 153,205

[52] U.S. Cl. ..........................408/1, 408/22, 408/56, 29/157.1, 29/407, 29/558, 408/79
[51] Int. Cl. .......................B23b 35/00, B23b 41/00
[58] Field of Search ............................408/1, 37–41, 408/79; 29/157.1, 407, 558; 10/107

[56] References Cited

UNITED STATES PATENTS 130,577   8/1872   Gunn......................................408/38
2,953,069   9/1960   Smith............................29/157.1 R

*Primary Examiner*—Francis S. Husar
*Attorney*—Learman & McCulloch

[57] ABSTRACT

The method of, and system for, machining valve body castings, and the like, having inlet and outlet cored openings in opposite ends thereof, a valve seat, and a cored bonnet opening in the side thereof comprising the steps of: positively locating the casting via the opposed cored openings by inserting locating plugs in the inlet and outlet openings; machining the bonnet opening and/or seat of the positively located valve body; repositioning the valve body and positively locating on the machined bonnet opening and/or seat; and then machining the cored inlet and outlet openings or flange openings in opposite ends thereof.

13 Claims, 9 Drawing Figures

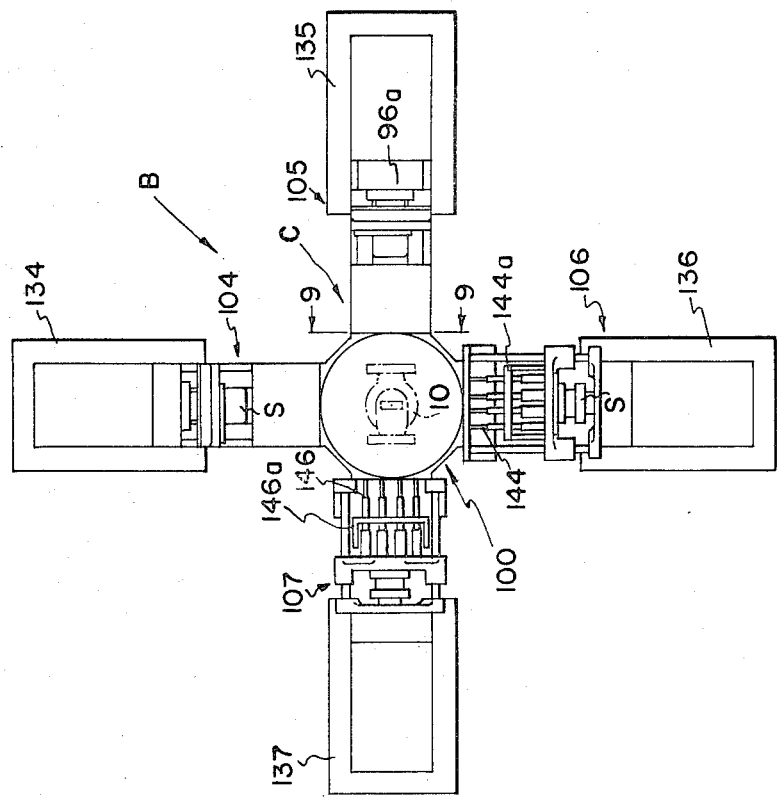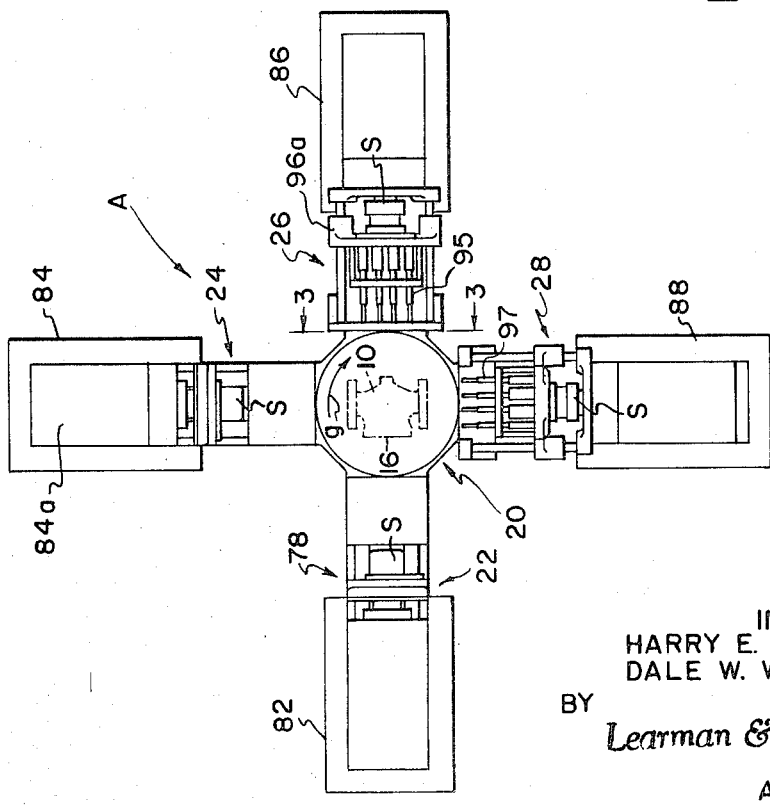
FIG.1

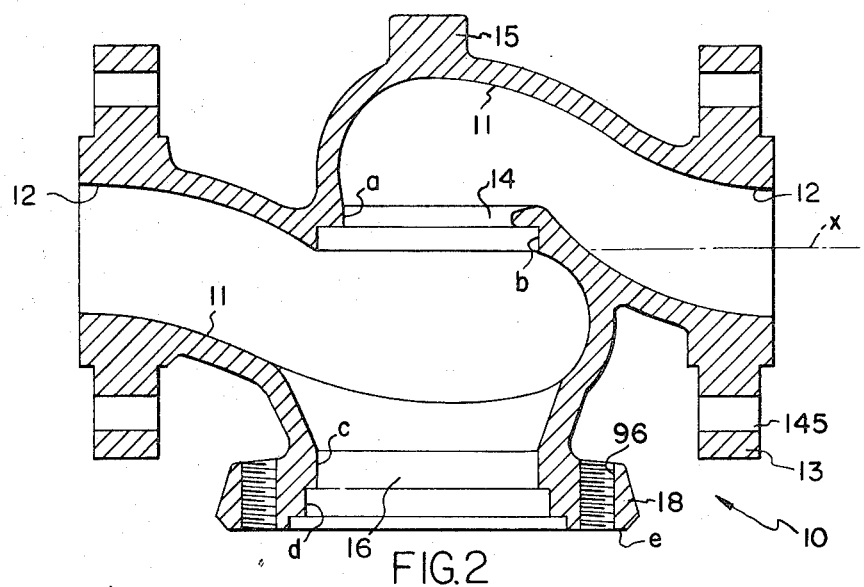
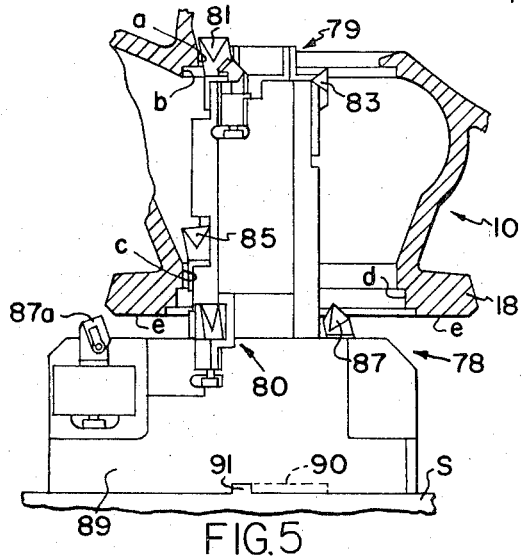
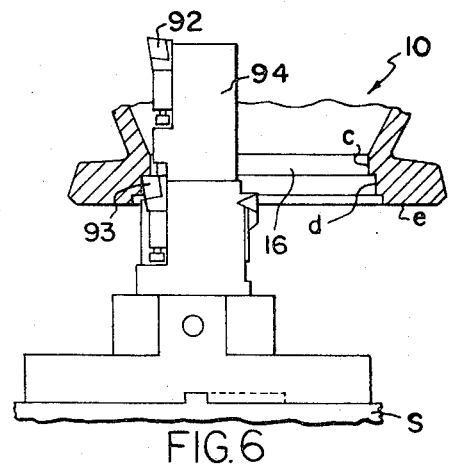
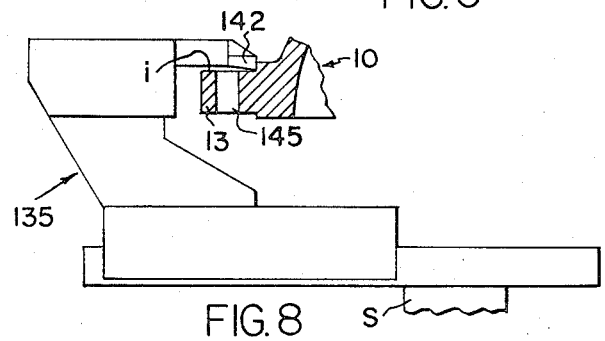
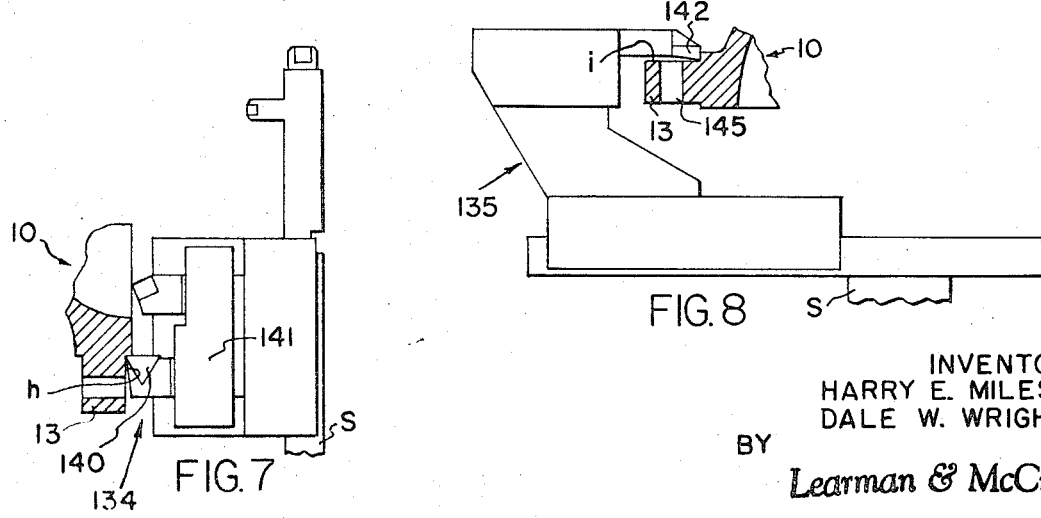

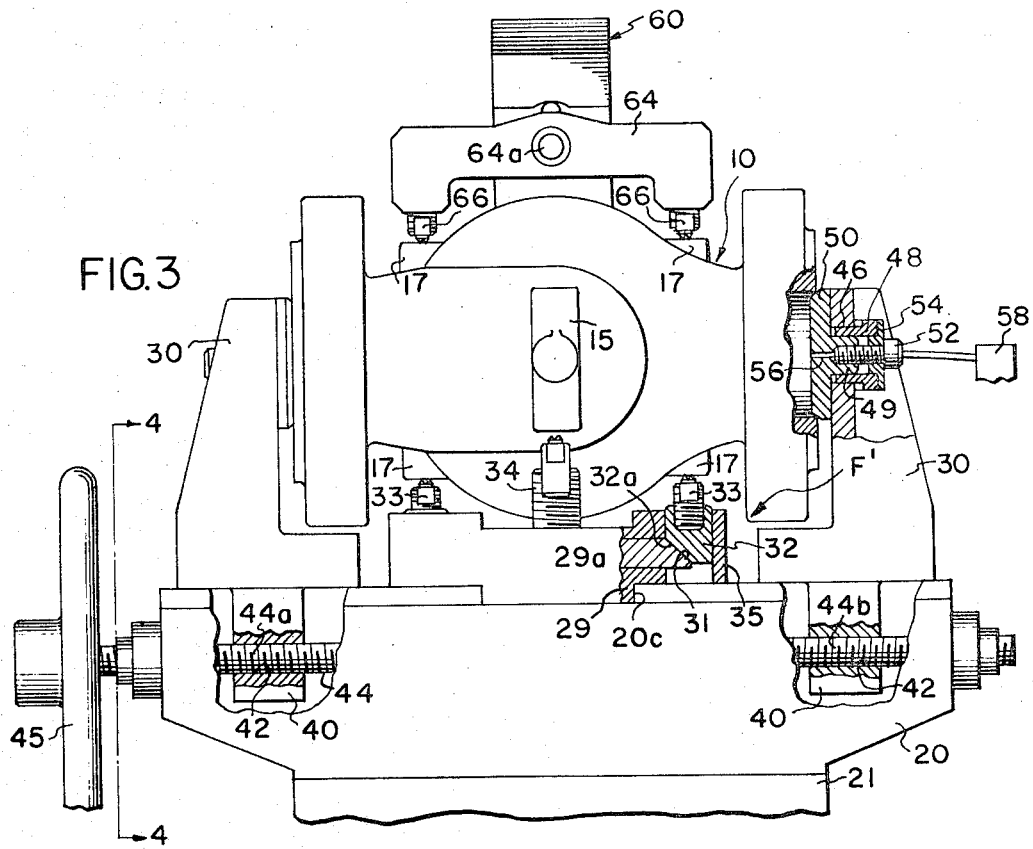
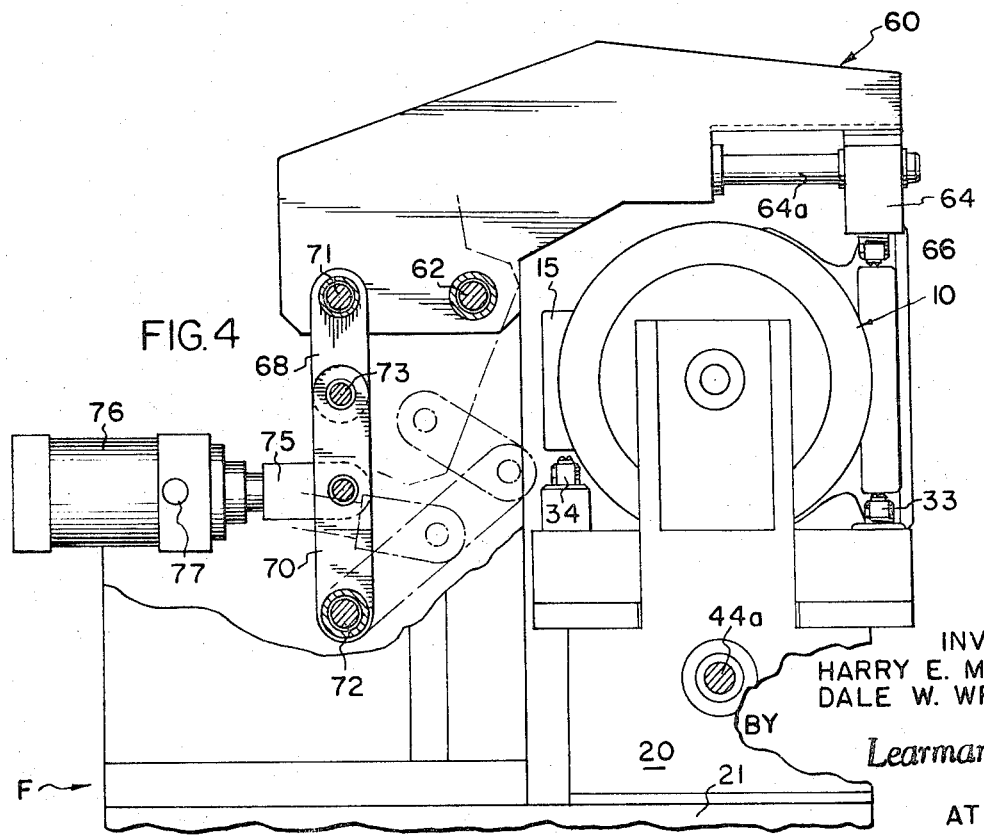

METHOD FOR MACHINING VALVE BODY CASTINGS

FIELD OF THE INVENTION

This invention relates to machining systems and methods, and more particularly to a new and improved method and apparatus for positively locating and machining valve bodies.

BACKGROUND OF THE INVENTION

The machining of cast products, such as valve bodies and other related castings, must be accomplished with speed, efficiency, and accuracy. Accordingly, it is a primary object of the present invention to provide a machining system for accurately and efficiently machining valve body castings, and the like.

In the valve body castings of the type disclosed herein having cored openings in opposite ends, a valve seat, and a bonnet opening in the side thereof, the relative positions of the various finally machined openings is an important consideration in machining the parts. Accordingly, it is an object of the present invention to provide a method and system for machining a valve body and the like by locating on the cored openings of a valve body to machine the bonnet opening and then locating on the machined bonnet opening to machine the cored openings or flange openings.

In machining valve bodies, which include interior valve seats, the introduction of coolant to the cutting tool machining an interior portion of the valve, has presented a problem. Accordingly, it is a further object of the present invention to provide new and novel apparatus incorporated with locating members which are employed for introducing liquid to a cutting tool interiorly of the side wall of a hollow valve body to facilitate cutting.

Other objects and advantages of the present invention will become apparent as the description thereof proceeds.

THE SUMMARY OF THE INVENTION

A system of machining cast valve bodies, and the like, having cored inlet and outlet openings at opposite ends thereof a cored bonnet opening, and a valve seat, the bonnet opening and valve seat each having an axis generally perpendicular to the axis of the inlet and outlet openings comprising: locating apparatus including locating plugs insertable into the cored inlet and outlet openings, as cast, to accurately position the valve body on a support member; apparatus for machining the bonnet opening and/or seat while the valve body is thus located; apparatus for removing the locating apparatus from the inlet and outlet openings; apparatus for clamping the partially machined valve body on a locating member which is received in the machined bonnet opening or seat, and apparatus for machining the end portions of the valve body adjacent the cored inlet and outlet openings while locating on the machined bonnet opening or seat.

The present invention may more readily be described by reference to the accompanying drawings in which:

BRIEF DESCRIPTION OF THE DRAWINGS

FIG. 1 is a top plan view schematically illustrating a machining system constructed according to the present invention;

FIG. 2 is a sectional, side view of a typical valve body which is machined by apparatus constructed according to the present invention;

FIG. 3 is a fragmentary, side elevational view, taken along the line 3—3 of FIG. 1, and particularly illustrating a valve body clamped to an indexible turntable and located for an initial machining operation by tapered locating plugs received in the inlet and outlet cored openings, as cast;

FIG. 4 is a sectional end view, taken along the line 4—4 of FIG. 3;

FIG. 5 is a fragmentary, sectional plan view, particularly illustrating apparatus for machining the bonnet opening and valve seat at the first machining station;

FIG. 6 is a fragmentary, sectional plan view, particularly illustrating apparatus at the second machining station for finish boring the bonnet opening;

FIG. 7 is a fragmentary, sectional plan view illustrating apparatus for facing the port flanges on the ends of the valve body;

FIG. 8 is a fragmentary, sectional plan view particularly illustrating apparatus for back-facing the port flanges on the ends of the valve body.

THE GENERAL DESCRIPTION

Figure 9:
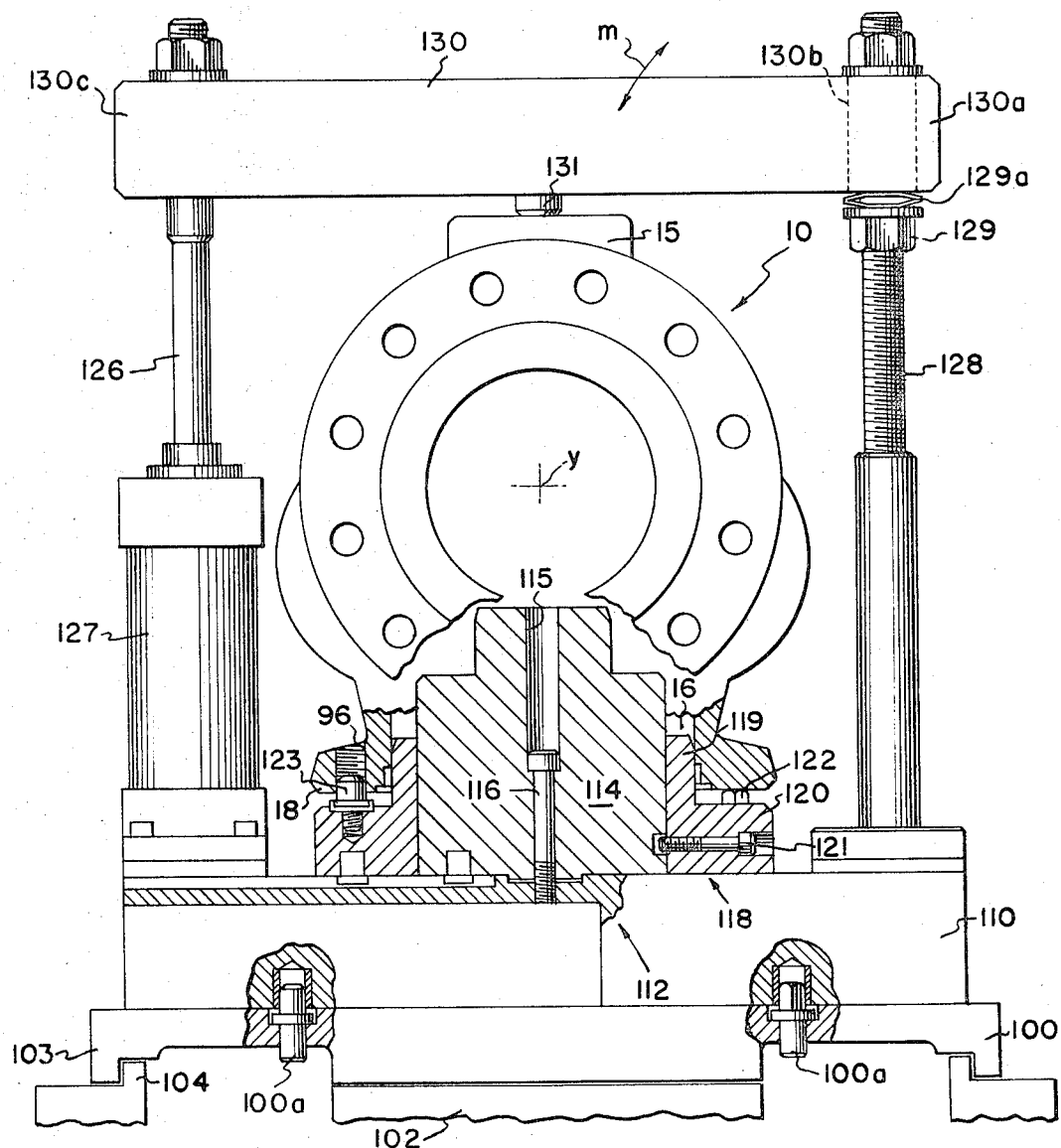
FIG. 9 is a side elevational view taken along the line 9—9 of FIG. 1, and particularly illustrating the locating plug which is received in the machined bonnet opening of the valve body to locate the valve body when port flanges are machined.

Apparatus constructed according to the present invention is generally illustrated in FIG. 1 and includes bonnet opening machining apparatus, generally designated A, which locates on the cored openings 12 in opposite ends of a cast valve body 10 and machines the bonnet opening 16 (FIG. 2) of a valve body 10, and machining apparatus B for machining the cored end openings 12 while locating on the already machined bonnet opening 16.

THE DESCRIPTION OF THE PREFERRED EMBODIMENT

Apparatus constructed according to the present invention is particularly well suited for machining a rough casting, such as the valve body, generally illustrated at 10 in FIG. 2, having a pair of longitudinally extending, non-axially aligned cored passages or openings 11 therein terminating in inlet and outlet ports 12 at opposite ends of the casting 10. The passages 11 communicate with each other through a valve seat opening 14 in the interior of the body 10. Perimetrical port flanges 13 are provided on opposite ends of the casting 10 for mounting the valve body to conduits and the like (not shown). A single support lug 15, (FIGS. 2, 3 and 4) on the underside of the rear portion of the body 10, and pairs of support or locating lugs 17 (FIGS. 3 and 4) on the upper and lower sides of the front portion of the body 10 are integrally cast on the body 10 for a purpose to be described more fully hereinafter.

A bonnet opening, generally designated 16, is cast into the side of the valve body 10 in communication with one of the axial passages 11 and in generally radial alignment with the valve seat opening 14. A bonnet flange 18 is integrally cast with the body 10 for mounting a valve bonnet (not shown) which mounts a valve steam (not shown) and a valve (not shown) as usual.

The valve body 10 is initially supported by an indexible turntable, generally designated 20, which is indexibly mounted on a support frame F to sequentially position the valve body 10 at a plurality of circumferentially spaced work stations, generally designated 22, 24, 26 and 28. The turntable 20 includes a vertical support post 21 which is rotatably supported on the frame F and is turned about its axis by a suitable source of power such as an electric motor (not shown) and operates via suitable geneva mechanisms, for instance, to index the workpiece.

As is best illustrated in FIGS. 3 and 4, the body 10 is supported by a fixture F' provided on the turntable 20. The fixture F' includes a vertical post 29 which is received in an opening 20c in the turntable. Level equalizing apparatus is supported on the post 29 for horizontal movement and includes tapered support surfaces 31 on a freely slidable plate 29a in bearing engagement with complementally tapered guide surfaces 32a on the undersides of supporting bar members 32 which mount a pair of front rest pads 33. A single rear rest pad 34 is also provided on fixture F' but is not a locating pad, since, as later will appear, when the workpiece 10 is clamped, it is lifted off the pad 34. Horizontal outward movement of the parallel bars 32 is prevented by an enclosure wall 35 which is supported on the table 20 and encases the bar members 32 that are in vertical sliding engagement therewith. As illustrated in FIGS. 3 and 4, the single, rear rest pad 34 is elevated slightly above the front pads 33 to engage the lug 15. Pads 33 engage lugs 17 on the underside of the body 10 when the workpiece is clamped. By permitting relatively vertical movement of the pads 33 and 34, when clamping occurs, the valve body 10 is oriented about the axis y to allow for "as cast" variations in the valve body.

For properly locating the valve body 10 in conjunction with the locating pads 33 and 34, a pair of locating slides 30 comprising a portion of fixture assembly F' are slidably mounted on the turntable 20 and include integrally formed dependent nuts 40 having oppositely threaded bores 42 therethrough for receiving a screw 44 having oppositely threaded ends 44a and 44b for moving the locating slides 30 simultaneously, in opposite directions, toward and away from each other when the hand-wheel 45 attached to one end of the screw 44 is turned. Each of the locating slides 30 has a bore 46 therein receiving a bushing 48 in which the stem 49 of a tapered locating plug 50 is slidably received. An adjustment bolt 52 is received in an apertured end cap 54 and is threaded into the stem 49 to axially adjust each plug 50 relative to the slide 30. A fluid communicating passage 56 is provided in each locating plug 50 and is in communication with a source 58 of cooling or cutting fluid for a purpose to be described more particularly hereinafter.

To assist in locating and clamping the valve body 10 on the turntable 20, fixture F' also includes a hydraulically operated clamping head 60 pivotally mounted on a horizontal shaft 62, suitably supported on the turntable for pivotal movement between the solid line position illustrated in FIG. 4, and the chain line position, partly illustrated in FIG. 4. At its forward end, the clamping head 60 mounts a cross beam 64 having a pair of clamp pads 66 depending therefrom for engaging the "as cast" lugs 17 on the upper surface of the valve body 10. Beam 64 is rockably mounted on shaft 64a. The integrally cast lugs need not be machined to provide precise clamping surfaces.

A pair of links 68 and 70, pivotally connected with the pivot pins 71 and 72 fixed to the head 60 and turntable 20, respectively, are pivotally connected to each other by a pivot pin 73 and are movable between the solid and chain line positions illustrated in FIG. 4, by means of the piston rod 75 of a solenoid actuated, fluid operated cylinder 76 which is pivotally mounted on the turntable by a pivot pin 77. The valve body 10 is clamped to the indexing turntable 20 in a position rotated 90° about its longitudinal axis $x$ from the position in which it is illustrated in FIG. 2.

Surrounding the turntable 20 are a plurality of power-operated machining head assemblies 82, 84, 86 and 88 at the work stations 22, 24, 26 and 28 respectively, which may be of the general character described in U.S. Pat. No. 2,915,924 granted Dec. 8, 1959, for example. Alternatively, each of the machining assemblies 82, 84, 86 and 88 may comprise a heavy duty slide feed unit, such as that manufactured by Miles Machinery Corporation of Saginaw, Michigan, which features easily adjustable controls for rapid advance, variable feed and rapid return cycles. In either case, each of these heads includes a rotary spindle S which may be rapid traversed to and from machining position and fed in a machining pass in the usual manner. The machining apparatus 82 includes a tool supporting body, illustrated generally at 78 (FIG. 5) supported on a horizontally movable slide 89, mounted on its machining assembly spindle S, and having, at its axially outer end, a valve seat machining tool system 79 and, at an axially inner portion thereof, a bonnet opening machining tool system 80. The valve seat machining system 78 includes a boring tool 81 for rough boring the surface $a$ in the valve seat opening 14 and a counterboring tool 83 for rough counterboring surface $b$.

The bonnet opening tool system 80 includes boring and counterboring tools 85 and 87 for rough boring and rough counterboring the surfaces $c$ and $d$ respectively in the bonnet opening 16. A facing tool 87a is mounted on the slide 89. Conventional apparatus (not shown) is provided for moving the slide 89 and the facing tool 87a radially relative to the bonnet opening 16 to face the surface $e$ of the bonnet flange 18. A guide track 90 is provided on the slide 89 and receives a guide 91 on the spindle S of the machining apparatus 82 for guiding the radial movement of the slide 89.

It is important to note that when the valve seat opening 14 is being bored and counterbored, cooling or cutting fluid is supplied through the ports 56 in the locating plugs 50 through the valve body passages 11 to the surfaces $a$ and $b$ being machined.

The machining head 84, at the second machining station 24, comprises a finish boring and counterboring tool system including a head 94 having axially spaced boring tools 92 and 93 for more finish boring and counterboring respectively, of the surfaces $c$ and $d$. Apparatus, generally designated 84a, is provided for moving the head 94 axially toward and away from a valve body casting 10 on the turntable 20.

The conventional machining tool assembly 86, at the downstream work station 26, includes a plurality of circumferentially spaced rotary drills 95 which drill bores 96 through the valve body bonnet flange 18. The individually rotated drills are carried by a common drill head 96a (FIG. 1) on the assembly spindle S and conventional mechanism is provided for driving the drills individually. This may comprise a conventional gear box mechanism for translating rotation of spindle S to individual rotation of each drill 95.

At the fourth work station 28, the machining head mechanism 88 includes a plurality of circumferentially spaced taps 97, which tap the holes 96 in the bonnet flange 18. The tapping head mounting the tapping units 97 is of the same general construction as the drilling head. The taps are also individually driven from the spindle S, and the spindle S is reversible to back out the taps.

The apparatus, generally designated B, in FIG. 1, for machining the port flanges 13, includes a turntable 100 mounted on a vertical post 102 which is rotatably mounted on a second frame or base C and is adapted to receive the partially machined valve body 10. Apparatus (not shown) is provided for rotating the post 102 about its axis to move the valve body 10 mounted thereon between a plurality of circumferentially spaced apart work stations, generally designated 104, 105, 106 and 107. The turntable 100, which may be indexed in the same manner as turntable 20, includes an annular flange 103 rotatably journaled by a frame supported annular guide rib 104. Mounted atop the table 100, by locating pins 100a, is a fixture base 110 having a locating plug assembly, generally designated 112, centered thereon. The locating plug assembly 112 comprises a cylindrically shaped arbor 114 having a central bore 115 therethrough for receiving a bolt 116 which is threaded into the fixture base 110. Received on the arbor 114 is a plug collar, generally designated 118, including an annular base portion 120 fixed to the arbor 114 by screws 121 and a flange 119 receivable in the already machined bonnet opening 16. The screws 121 removably couple the collar 118 to the arbor 114. A plurality of rest buttons 122 are provided on the base 120 for supporting the bonnet flange 18 of a valve body 10 mounted on the centering plug 112. To properly orient the valve body 10 on the centering plug 112, a valve body orienting button 123 is provided on the base 120 and is adapted to be received in one of the threaded holes 96 provided in the bonnet flange 18. As illustrated in FIG. 9, the annular plug 119 is snugly received by the finished surface c of the bonnet opening 16 to precisely position the valve body 10 on the turntable 100.

For clamping a valve body 10 to the fixture base 110, a clamping bar 130 is provided and is supported at one end 130a on the upper end of a threaded post 128 mounted on the fixture base 110. A pair of nuts 129, threaded on the post 128, generally determine the vertical position of the end 130a of the bar 130. The end 130a of the bar 130 includes an enlarged bore 130b freely receiving the post 128 so as to permit limited swinging movement of the bar 130 in a vertical path, designated by the arrow m (FIG. 9). An expansion spring 129a is provided between the lower nut 129 and the bar 130 to constantly, but yieldably, urge the bar 130 to the position illustrated in the drawing.

To vertically swing the bar 130 in the direction of the arrow m, against the biasing force of spring 129a, between clamping and unclamping positions, a double acting, solenoid actuated, fluid operated cylinder 127 is supported on the base 110 and includes a piston rod 126 fixed to the end 130c of the bar 130. A work engaging button 131 is provided on the underside of the bar 130 for engaging the support lug 15 on the valve body 10 when the bar 130 is lowered to the clamping position illustrated in the drawing.

A plurality of machining tool assemblies, generally designated 134, 135, 136 and 137 and of the construction previously mentioned, is provided at work stations 104, 105, 106 and 107, respectively. The machining tool assembly 134 comprises a facing tool 140 (FIG. 7) mounted on a slide 141 which is axially and transversely movable for facing the surface h of one of the port flanges 13. The slide 141 is mounted on the spindle S of head assembly 134.

The machining apparatus 135, at station 105, comprises a back facing tool 142 for facing the back surface i of the port flange 13. Tool 142 is mounted on the spindle S of machining head 135.

The machining apparatus 136, at the station 106, comprises a plurality of drills 144 for drilling holes 145 in the port flanges 13. The drills 144 are mounted on a drill plate 144a on the spindle S of machining head 136 for individual rotation in the manner previously designated.

The machining apparatus 137 comprises a plurality of taps 146 for tapping the drilled holes 145 in the flange 13. The taps are mounted for individual rotation on a tapping head 146a mounted on the spindle S of machining head 137. It should be realized, of course, that the machining assemblies 134 and 136 can operate simultaneously, and that the machining assemblies 137 and 135 can also operate simultaneously, to simultaneously machine opposite end flanges 13 of the body 10. Each of the machining assemblies 134, 135, 136 and 137 is equipped with a heavy-duty slide feed unit which features easily adjustable controls for rapid advance, variable feed, and rapid return cycles.

Because the bonnet flanges 13 on the valve bodies 10 are symmetrical, it is possible to utilize machining apparatus 82 to also face and drill the bonnet flanges 13. Because the valve bodies 10 are stationarily mounted on the indexing tables 20 and 100 and the various tools rotate to machine the valve body, the need for cumbersome rotating fixtures has been eliminated and a greater rigidity is possible, permitting greater precision in machining. As is evidenced from the description, the present system also allows a number of operations to be performed, either simultaneously or sequentially, with a single chucking of the workpiece. By minimizing the number of times the part is handled, productivity is increased and machining quality is improved. It has been found that, with apparatus constructed according to the present invention, valve body castings of the type described can be completely machined at an average rate of 7.5 parts per hour with only one operator. Control valve bodies ranging from one-half inch through 6 inch sizes have been satisfactorily machined with apparatus constructed according to the present invention. This apparatus permits fast changeover from one size or variety of valve body to another, thereby permitting optimum productivity. Gate valve bodies may also be machined utilizing the principles and concepts of the present invention.

THE OPERATION

To summarize the operation, a rough valve body casting 10 is initially placed on the support pads 33 and 34 provided on the turntable 20. The tapered plugs 50 are inserted into the cored ports 12 via hand-wheel 45 to locate the body 10 and lift the body 10 off the pad 34. Immediately after locating has been accomplished, the clamping head 60 is operated to clamp the valve body in position. Upon clamping, the valve body 10 rotates slightly about the longitudinal axis thereof to raise the lug 15 slightly off the rest pad 34, and return the lowermost front lugs 17 into engagement with the pad 33. The locating pads 33 are relatively vertically movable to accommodate to the particular valve body as cast. The valve body 10 to be machined is then indexed to a position opposite the boring head 78, at station 82, where the bonnet opening 16 and the valve seat opening 14 are rough bored, rough counterbored and faced. The table 20 is then indexed to the station 84 where the surfaces a and b are finish bored and counterbored with the finishing tools 92 and 93. When the valve opening is being bored, counterbored and finish bored, cutting fluid is passed through the passages 56 through the locating plugs 50 to facilitate cutting and to cool the cutting tools 81, 79, 85 and 87.

The table 10 is then indexed to move the valve body 10 to a position opposite the drills 95 for multiple drilling of the port flange 13, and then is finally indexed to a position opposite the taps 97 where the drilled holes 145 are tapped. When the taps 97 have been backed out, the operator releases the hydraulic clamp 60, unloads the valve body from the turntable 10, and loads it on the other turntable 100.

The valve body 10 is positioned on the turntable 100 with plug 119 snugly received by the surface c of the bonnet opening 16. The hydraulically operated clamping cylinder 127 is then actuated to move the clamping bar 130 into clamping engagement with the valve body 10.

The turntable 100 may then be indexed so that the valve body 10 is positioned opposite the head 134 at the station 104 where one of the flanges 13 is back-faced while the opposite flange 13 is multiple drilled at station 106 by the drills 144. The turntable 100 is then indexed 90° and the back-faced flange is step-faced at station 105, while the drilled flange is tapped at station 107. The turntable 100 is again indexed 90° and the faced flange is drilled at station 100 while the opposite flange is back-faced at station 104. The table 100 is then indexed to the final position where the just drilled holes are tapped at station 107, and the flange on the opposite end is step-faced.

If the valve body 10 does not include port flanges 13 and the ports 12 are to be drilled and tapped, the machining apparatus and cycle is slightly different. The combination tool at the first station 104 would comprise drilling and facing apparatus for drilling and plunge facing one of the openings 12. The table 100 would then be indexed 180° so that the opposite port 12 is drilled and faced. The table 100 is then indexed 90° to present the first opening to a tapping apparatus provided at station 105. The table 100 is then finally rotated 180° to present the opposite port 12 to the tapping apparatus at station 105 to tap the opposite port 12.

Because the valve body 10 is precisely located on locating plug 119, the holes 12 are accurately and precisely tapped in the second version and the flanges 13 are accurately spaced, drilled, and tapped in the illustrated version of the valve body. The machining cycles of the apparatus illustrated in FIG. 1 is completely automatic so that one operator is able to unload and reload valve bodies from and onto the table 12 while the table 100 is indexing in a machining cycle and vice versa.

It should be understood that any reference to the machining of portions of the valve body adjacent the ports may interchangeably refer to either the flanges 13 in the illustrated version of the valve body or to the portion of the valve defining the ports 12 in the second version. Also, it should be understood that expandable arbors could be substituted for the plugs 50, if desired.

It should also be understood that the plugs 50 could also be inserted axially inwardly of the outer portions of ports 12 so as to locate on the valve seat openings in a gate valve body which are axially aligned with the outer portions of inlet and outlet openings 12 and may be considered to comprise portions thereof.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. A method of machining valve body castings and the like, having cored inlet and outlet openings at opposite ends thereof and a cored bonnet opening in the side thereof comprising the steps of:

inserting locating plug members into the cored inlet and outlet openings as cast, to position the casting on a support member and clamping the casting to the support member in a manner to positively locate said casting and prevent its rotation;

machining said bonnet opening while the casting is thus positioned;

unclamping the casting from the support member and repositioning the casting on a locating plug received in the machined bonnet opening; and machining the end portions of said casting adjacent said cored inlet and outlet openings.

2. A method of machining a casting, such as a valve body and the like, having communicating cored openings in opposite ends thereof and a communicating bonnet opening in the side of said body comprising the steps of:

locating on at least one of said cored openings, as cast, and machining the bonnet opening; and then locating on the machined bonnet opening and machining the portions of said valve body adjacent said cored openings in said opposite ends.

3. A method of machining a valve body casting, or the like, having cored inlet and outlet openings at opposite ends thereof and a cored bonnet opening in the side thereof comprising:

positively locating said valve body casting on first plug means receivable in said inlet and outlet openings, as cast;

machining said bonnet opening by moving rotating cutting tool means toward and away from the located valve body;

relatively moving said valve body and said first plug means to remove said first plug means from said valve body;

positively relocating the valve body on additional plug means receivable in the machined bonnet opening; and machining said opposite end portions of said valve body adjacent said inlet and outlet openings by moving additional rotating cutting means toward and away from said additional plug means and said valve body.

4. The method set forth in claim 3 including the step of machining a valve seat interiorly of said valve body when said bonnet opening is being machined; and introducing fluid through at least one of said cored inlet and outlet openings to facilitate machining of said valve seat.

5. The method set forth in claim 3 wherein said locating step includes the step of clamping said valve body casting to indexible means when said bonnet opening is machined.

6. The method set forth in claim 5 wherein said locating step is accomplished by initially supporting the side of said valve body, opposite said bonnet opening, on said indexible means when said first plug means is received in said inlet and outlet openings, said clamping step being accomplished by slightly turning said valve body, about the axes of said inlet and outlet openings, to raise said opposite side of said valve body to a raised position in which it is machined.

7. The method set forth in claim 3 wherein said valve body includes a bonnet flange adjacent said bonnet opening; and said first mentioned machining step is accomplished at a first machining station by rough boring and rough counterboring said bonnet opening, and facing said bonnet flange.

8. The method set forth in claim 7 wherein the machining of said opposite end portions is accomplished by finish boring and finish counter boring said bonnet opening at a second machining station downstream of first station.

9. The method set forth in claim 8 wherein said first machining step further includes drilling openings in said flange at a third station downstream of said second station; and tapping said drilled openings at a fourth station downstream of said third station.

10. The apparatus set forth in claim 9 wherein said casting includes mounting flanges adjacent said inlet and outlet openings; said second machining step is accomplished by facing the axially inner faces of at least one of said mounting flanges at a fifth station, and facing the axially outer face of said one flange at a sixth station, downstream of said fifth station.

11. The apparatus set forth in claim 9 wherein said second machining step is accomplished by drilling said mounting flanges at a fifth machining station, and tapping said drilled openings at a sixth station downstream from said fifth station.

12. A method of machining a valve body casting, or the like, having inlet and outlet openings at opposite ends thereof, a bonnet opening in the side thereof, and a valve seat adjacent said bonnet opening and adjacent at least one of said inlet and outlet openings, comprising:

clamping said valve body to a table for supporting a valve body to be machined;

maching the bonnet opening by moving rotating cutting tool means toward and away from said work table and a valve body supported thereon between remote and operative positions to interiorly machine said valve seat;

said step of clamping being accomplished by locating on at least one of said inlet and outlet openings of said body when it is being machined, and introducing fluid interiorly of said valve body through one of said inlet and outlet openings to facilitate the machining of said valve seat.

13. A method of machining a valve body casting, or the like, having a cored opening comprising inlet and outlet portions at opposite ends thereof, and an additional portion having an axis generally perpendicular to the axes of the inlet and outlet portions comprising:

supporting a valve body to be machined;

positively locating said valve body on said support means by inserting locating means on locating surfaces in said opening as cast;

machining said additional portion by moving rotating cutting tool means toward and away from the located valve body;

relatively moving said valve body and said locating means to remove said locating means from said inlet and outlet portions;

positively relocating the valve by inserting locating means in the machined additional portion; and moving additional rotating cutting tool means toward and away from said additional locating means and said valve body to machine opposite end portions of said valve body adjacent said inlet and outlet portions.

* * * * *